(12) United States Patent
Parent

(10) Patent No.: US 7,862,167 B2
(45) Date of Patent: Jan. 4, 2011

(54) LINEAR ELEMENT, ESPECIALLY A SPECTACLE SIDE, AND METHOD OF PRODUCING IT

(75) Inventor: Pierre Parent, Morbier (FR)

(73) Assignee: Logo SA, Morez (FR)

( * ) Notice: Subject to any disclaimer, the term of this patent is extended or adjusted under 35 U.S.C. 154(b) by 61 days.

(21) Appl. No.: 12/296,941

(22) PCT Filed: Jan. 17, 2007

(86) PCT No.: PCT/FR2007/000097

§ 371 (c)(1),
(2), (4) Date: Oct. 13, 2008

(87) PCT Pub. No.: WO2007/118942

PCT Pub. Date: Oct. 25, 2007

(65) Prior Publication Data

US 2009/0161063 A1    Jun. 25, 2009

(30) Foreign Application Priority Data

Apr. 18, 2006   (FR) .................................. 06 03591

(51) Int. Cl.
*G02C 5/14*     (2006.01)
*G02C 1/00*     (2006.01)

(52) U.S. Cl. ........................................ 351/111; 351/41

(58) Field of Classification Search ................ 351/114, 351/117, 122, 111, 41, 158; 148/563; 264/239, 264/250, 260
See application file for complete search history.

(56) References Cited

U.S. PATENT DOCUMENTS 3,627,406 A * 12/1971 Blumenthal ................ 351/164

FOREIGN PATENT DOCUMENTS

| CH | 295429 A | 12/1953 |
|---|---|---|
| FR | 2198165 A | 3/1974 |
| FR | 2522834 A1 | 9/1983 |
| FR | 2594234 A1 | 8/1987 |
| FR | 2612305 A1 | 9/1988 |
| FR | 2785058 A1 | 4/2000 |
| GB | 542876 A | 1/1942 |
| WO | 2004/077128 A1 | 9/2004 |

* cited by examiner

*Primary Examiner*—Hung X Dang
(74) *Attorney, Agent, or Firm*—Bachman & LaPointe, P.C.

(57) ABSTRACT

A linear element, especially a spectacle side, of the type comprising a flexible metal core coated with a flexible elastomer for comfort and/or appearance. Its structure is composed of a plurality of rigid plastic rings placed in fixed positions around predetermined areas of the flexible metal core so that each can serve as a point of intermediate mechanical attachment of the flexible elastomer with respect to the core. The cross section of the rings are inscribed within that of the elastomer surrounding it.

6 Claims, 2 Drawing Sheets

LINEAR ELEMENT, ESPECIALLY A SPECTACLE SIDE, AND METHOD OF PRODUCING IT

BACKGROUND (1) Field of the Invention

The present invention relates, in a general manner, to a filiform element of the type comprising a flexible metal core that is to be coated with a flexible elastomer for comfort and/or decoration.

(2) Prior Art

As an example of a nonlimiting application, it will be a spectacle arm.

A major difficulty encountered in the production of this type of arm lies precisely in the coating of a metal part with a flexible elastomer because the latter does not adhere to the metal, usually stainless steel.

Another difficulty lies in the centering of the metal core which must be situated at the heart of the elastomer during molding, during this operation, the elastomer being in the soft state.

A known manner of overcoming this difficulty is by threading a sheath of plastic over the arm, but the rigidity of this sheath necessitates not being able to cover the metal arm over its whole length for reasons of flexibility that the latter must have.

SUMMARY OF THE INVENTION

The object of the present invention is to remedy these various disadvantages and accordingly relates to a filiform element, notably a spectacle arm, of the type comprising a flexible metal core, coated with a flexible elastomer for comfort and/or decoration, characterized in that its structure consists of a plurality of rings made of rigid plastic placed fixedly around predetermined zones of the flexible metal core in order to constitute as many intermediate mechanical coupling points of the flexible elastomer relative to the core, the section of the rings lying within that of the elastomer surrounding it.

The invention also relates to the features which will emerge in the course of the following description and which must be considered in isolation or in all their possible technical combinations.

BRIEF DESCRIPTION OF THE DRAWINGS

This description, given as a nonlimiting example, will make it possible better to understand how the invention may be embodied with reference to the appended drawings in which.

DETAILED DESCRIPTION OF THE PREFERRED EMBODIMENT(S)

Although the invention may be applied to any type of filiform element, its application to a spectacle arm will be described below.

Figure 1:
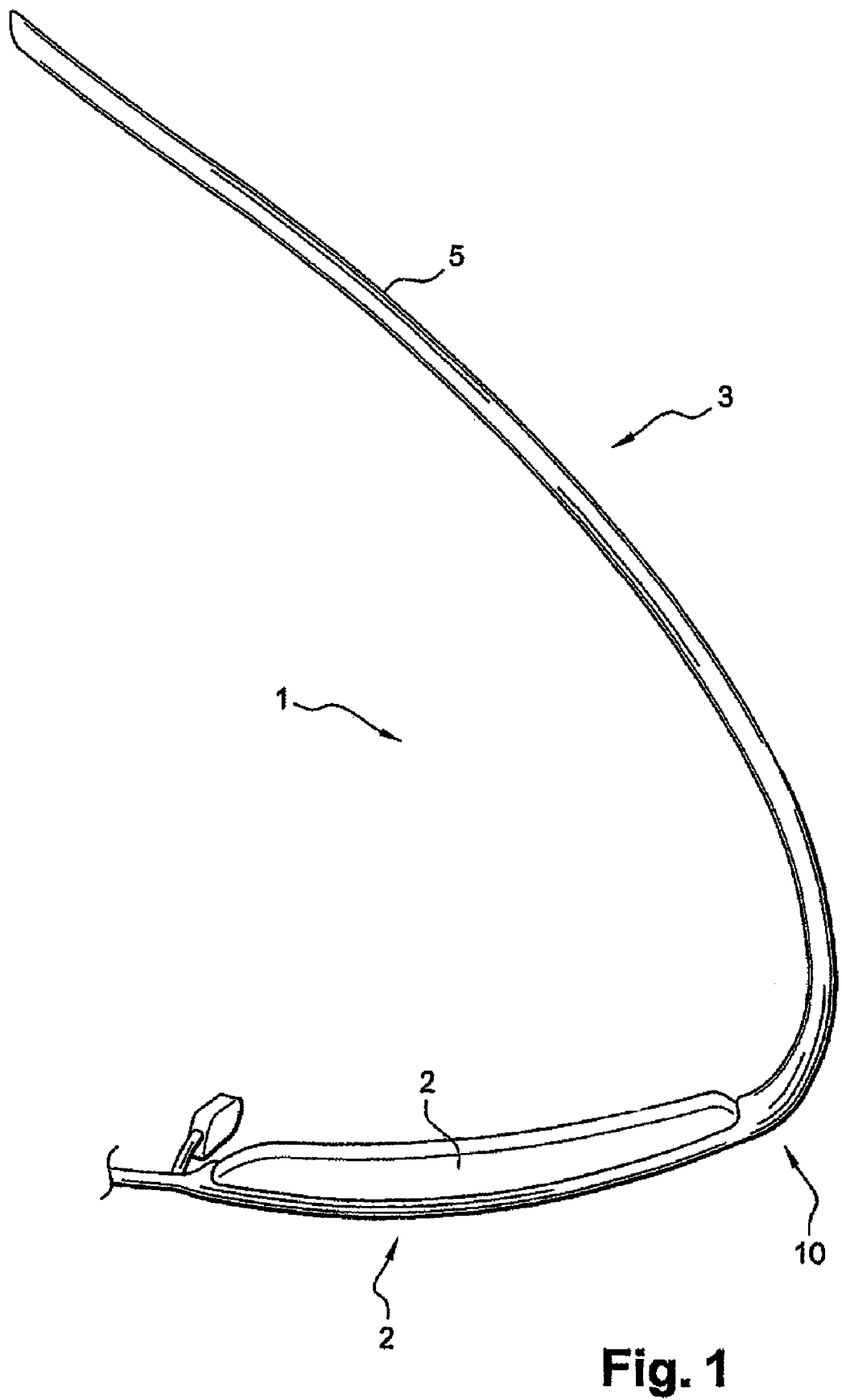
FIG. 1 represents a top view, in section, of a portion of spectacles fitted with side arms obtained according to the invention.

The spectacles 1 indicated in their entirety in FIG. 1 consist of an optical facade 2 consisting of lenses connected together at the center, and at their outer end to arms 3 by means of pin mounts 10.

According to the representation of FIG. 1, these are spectacles with mounts, but naturally they could equally be spectacles called pierced spectacles.

The arms 3 consist of a metal core 4, at least partially flexible, covered with a sleeve 5 made by molding a flexible elastomer for comfort and/or decoration.

According to the invention, the structure of the filiform element or arm 3 consists of a plurality of rings 6 made of rigid plastic, placed fixedly around predetermined zones of the flexible metal core 4 in order to form as many intermediate mechanical coupling points for the flexible elastomer 5 relative to the core 4, the section of the rings 6 lying within that of the elastomer 5 surrounding it.

Figure 3:
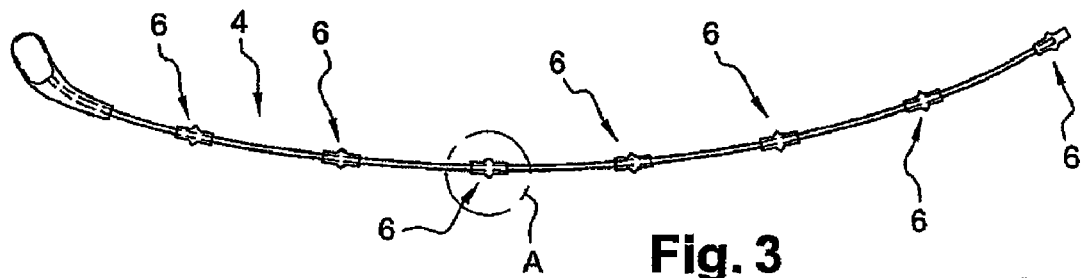
FIG. 3 is a top view of the metal core of the arm according to FIG. 2, fitted with rings for coupling the flexible elastomer to be overmolded.
Figure 4:
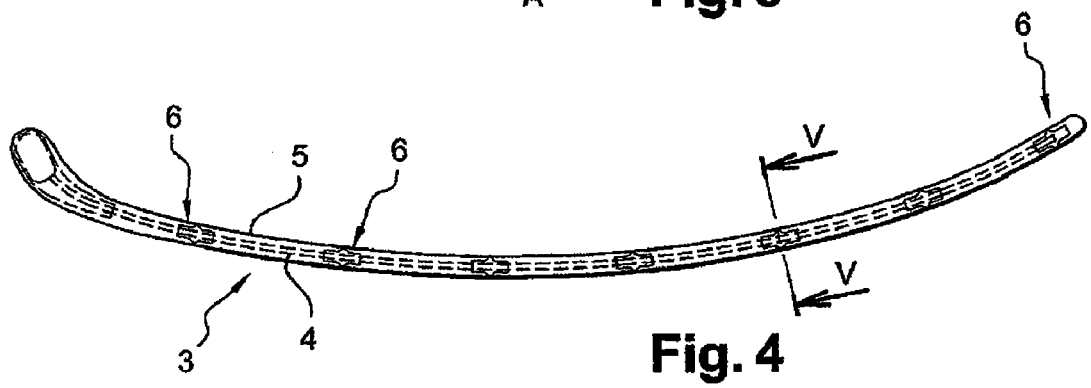
FIG. 4 is a view according to FIGS. 2 and 3, after overmolding of the elastomer.
Figure 5:
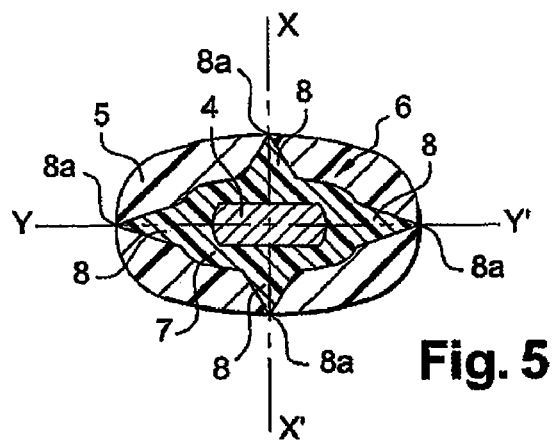
FIG. 5 is a view of a section of the arm, on an enlarged scale, along the line V-V of FIG. 4.

According to another feature of the invention, corresponding to the details A of FIG. 3 and represented on an enlarged scale in FIG. 5, the section of the rings 6 is symmetrical both in the vertical direction XX' and in the horizontal direction YY', so as to form a member for the centering of the flexible elastomer 5 relative to the metal core 4, during an operation of injection molding the first onto the second.

So that said rings 6 do not form as many plugs obstructing the passage of the elastomer in the mold during the injection operation, research has been made to cause the latter to creep. For this, each of the rings 6 consists of a central kernel 7 surrounding the metal core 4, with a section smaller than that of the elastomer 5 to be received during the operation of injecting the latter, said kernel 7 being bristled with at least four substantially conical mounts 8 evenly distributed about the kernel 7 on two axes XX'-YY' that are perpendicular to one another and whose peaks 8a lie within the section of the elastomer 5, so that said rings do not form as many plugs during the operation of injecting the elastomer.

It should be noted that the mounts 8 could be of any shape and that they could be made in the same alignment whether they are the mounts situated on the axis XX' or on the axis YY', but may also be offset from one another for ease of molding.

Figure 2:
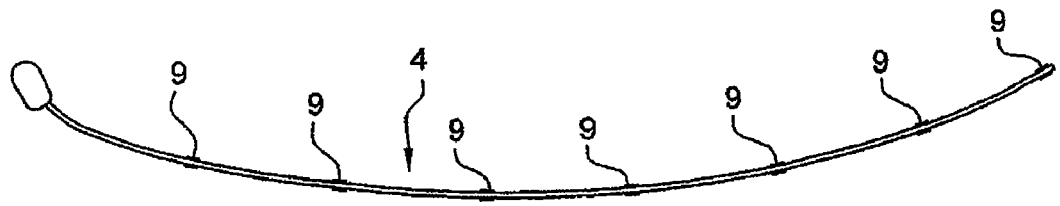
FIG. 2 is a top view of the metal core of an arm according to FIG. 1.

The invention also relates to the method of obtaining the filiform element or arm 1 that has just been described. This method is notable by the following steps:

cutting, to a chosen length, of a flexible metal wire designed to form the core 4, formation of the metal wire according to a chosen profile and section (FIG. 2), deformation 9 in places of the core 4 in predetermined zones designed to receive the rigid plastic rings 6, first injection of a rigid plastic onto the metal core 4 for the purpose of obtaining the rings 6, during a single operation in the locations 9 of the core 4 that are reserved therefor, second injection of a flexible elastomer 5 onto the metal core 4 provided with centering rings 6, for the purpose of obtaining comfort and/or decoration of the filiform element 3.

The deformations 9 in places of the metal core 4 are obtained by squeezing the core 4 on either side, so as to cause a narrowing in places of the latter in one direction, and a widening in another direction perpendicular to the first, in order to form as many coupling points for the rings 6.

The invention claimed is:

1. A filiform element, comprising a flexible metal core, coated with a flexible elastomer for comfort and/or decoration, a plurality of rings made of rigid plastic placed fixedly around predetermined zones of the flexible metal core in order to constitute intermediate mechanical coupling points for the flexible elastomer relative to the core and a section of each ring lying within the elastomer surrounding it.

2. The filiform element according to claim 1, wherein the section of each ring is symmetrical both in a vertical direction and in a horizontal direction, so as to form a member for the centering of the flexible elastomer relative to the metal core during an operation of injection molding the flexible elastomer onto the metal core.

3. The filiform element according to claim 2, wherein each of the rings consists of a central kernel surrounding the metal core, with a section smaller than that of the elastomer to be received during the injection molding operation, said kernel being bristled with at least four substantially conical mounts evenly distributed about the kernel on two axes that are perpendicular to one another and whose peaks lie within the section of the elastomer, so that said rings do not form plugs during the operation of the injection of the elastomer.

4. The filiform element of claim 1, wherein the filiform element is a spectacle arm.

5. A method for obtaining a filiform element, consisting of a flexible metal core coated with a flexible elastomer, said method comprising the steps of:
  cutting to a chosen length a flexible metal wire designed to form the metal core;
  forming the metal wire according to a chosen profile and section;
  deforming the core in places in predetermined zones designed to receive rigid plastic rings;
  injecting a rigid plastic onto the metal core for the purpose of obtaining the rigid plastic rings during a single operation in locations of the core that are reserved therefore; and
  injecting a flexible elastomer onto the metal core provided with said rings for the purpose of obtaining comfort and/or decoration of the filiform element.

6. The method as claimed in claim 5, wherein the determining step comprises squeezing the core on either side so as to cause a narrowing in places in one direction, and a widening in another direction perpendicular to the one direction in order to form coupling points for the rings.

* * * * *